Sept. 5, 1950     T. MARKS, JR     2,521,469

HOTBOX INDICATOR AND SIGNAL

Filed Dec. 10, 1948

INVENTOR.
Theodore Marks Jr.
BY
W. W. Williamson

Patented Sept. 5, 1950

2,521,469

UNITED STATES PATENT OFFICE 2,521,469

HOTBOX INDICATOR AND SIGNAL

Theodore Marks, Jr., Drexel Hill, Pa.

Application December 10, 1948, Serial No. 64,569

6 Claims. (Cl. 116—102)

My invention relates to a new and useful hot box indicator and signal particularly adapted to use in connection with the journal boxes of railway cars or coaches having air lines to be coupled together in a train and having or adapted to be connected with an air operated signal, preferably audible, in the vicinity of the train operator's position whereby, if any journal box becomes overheated, a signal will be imparted to the operator of the overheated condition by the continuous actuation of the signal means until the condition is corrected.

An object of the invention is to provide a control unit mounted on each and every journal box and connected with an air line, such as a pipe and, possibly, branches thereof, which air line leads to an air operated signal means or device on the same vehicle as the control units or on a vehicle, such as a locomotive. It is to be understood that wherever an air operated signal and air line are referred to the same are to include the operational functions of air being forced or drawn through said signal and air line.

Another object of the invention is to provide an indicator as a part of the control unit whereby the particular overheated journal will be quickly ascertainable by a person walking beside the cars or coaches equipped with the elements of the apparatus mentioned herein.

A further object of the present invention is to provide a valve controlled air passageway wherein the valve is held against its seat by a spring and unseated by a spring operated actuator held in a retracted position by a latch and released by a thermostat coacting with said latch.

With the above and other objects in view the invention consists of the details of construction and combination of elements hereinafter set forth and then designated by the claims.

In order that those skilled in the art to which this invention appertains may understand how to make and use the same I will describe a construction in detail referring by numerals to the accompanying drawing forming a part hereof, in which.

Figure 1:
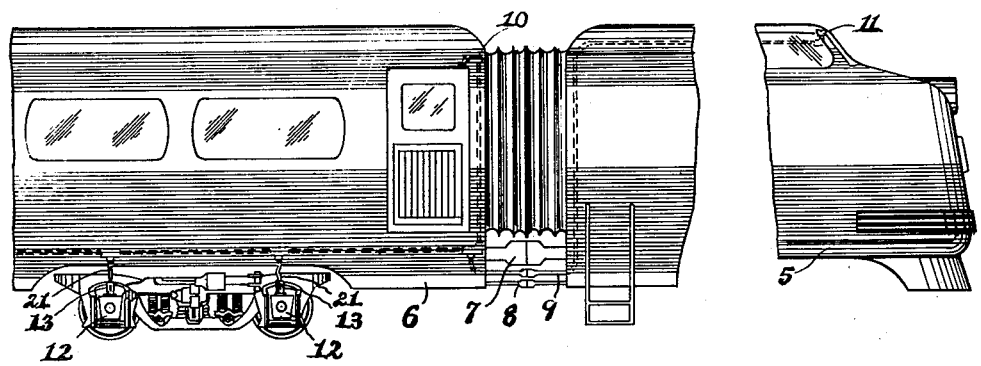
Fig. 1 is a side view of a part of a railway train illustrating an installation of an embodiment of my invention.

In carrying out my invention as herein embodied, I have shown, for purposes of illustration, a tractor vehicle 5 in the form of a conventional locomotive and a portion of a car 6 represented as a coach. These vehicles and any number of additional cars make up a train and said vehicles are attached to one another by the usual car couplings 7. Also shown are the usual brake air line 8 and signal air line 9 the separate vehicle elements of which are coupled together between vehicles. There may be a signal 10, such as a whistle, in one or both ends of the car or coach 6 and, positively, a signal 11 in the tractor vehicle adjacent the operator's position in such tractor vehicle. These may be the ordinary or regular signal means employed for signalling the operator as to the operations desired or such signal means can be part of a separate system.

On every journal box 12 of a properly equipped vehicle is mounted a control unit 13, either on top, as shown, a side or even the front depending somewhat upon the type of journal box with which the unit is employed.

Each control unit includes a casing 14 consisting of a body 15 open at one end, for example, the bottom which is afterwards closed by a closure plate 16 preferably detachably secured in place by fastening devices 17, such as screws. The unit is attached to the journal box in any suitable manner, as by bolts passing through holes 18 in the closure plate and threaded into a wall of said journal box. The casing also has an opening 19 in the top thereof which forms a part of an air passageway and said opening is surrounded by a neck 20 to receive one end of a flexible tube or hose 21 that has its other end suitably connected to the signal air line 9 so that the interior of the casing 14 is in communication with said air line. Further, said casing has a recess 22 in the outer face of one of the side walls, which recess has a hole 23 running from it to the interior of said casing.

Within the chamber of the casing body is a vertical tubular valve housing 24 open at both ends with the upper end of said valve housing in communication with the opening 19 and the lower end communicating with the casing body chamber some distance above the bottom or closure plate of the casing. A desirable construction consists of making the valve housing as a separate element with a constriction 25 at the upper end to fit in the opening 19 where it is retained in any suitable manner. Intermediate the ends of the valve housing, within the same, is an apertured partition 26 having a seat 27 on the upper face and providing a shoulder 28 on the lower face thereof and below said partition or seat is a side opening 29 through the valve housing.

Coacting with the valve seat 27 is a valve plug 30 having a stem 31 fitting the lower part of the valve housing in which said valve stem is slidably mounted. The lower end of the valve housing is spaced an appreciable distance above the bottom or closure plate of the casing and the lower end of the valve stem 31 projects below and outside of the valve housing. The valve plug is urged towards its seat by a spring 32 surrounding a reduced intermediate portion of the valve stem within the housing and having one end in engagement with the under side of the partition or, specifically, the shoulders 28, constituting a stationary element, and the other end in engagement with a shoulder 33 on the valve stem, constituting a movable element.

To unseat the valve a lower arm 34 of a bell-crank lever 35 is positioned under the lower end of the valve stem and is pivoted within the casing on a pivot 36 in a lug 37 and urged upwardly or towards the lower end of the valve stem by a spring 38 having one end attached to a part of the casing 14 and the other end to said arm 35. The arm 35 is held in a retracted position by a latch 39 pivoted at 40 and provided with a leg 41 to engage a stop 42 for limiting the movement of the latch towards the arm engaging position. The latch 39 is urged towards the arm engaging position by a spring 43, such as a flat spring, having its base end fixed to the inside of a casing wall and said latch has a beveled portion 44 for coaction with a beveled end 45 of the arm 35 whereby the latter may be readily pushed past the head of the latch for engagement under the nose or beak thereof.

The terminal or free end of the latch leg 41 projects beyond the stop 42, is unobstructed and is positioned to lie in the path of travel of the unattached upper end of an expansible thermostatic element 46 fixed to the bottom or closure plate so as to be in close proximity to the journal box when the control unit is mounted thereon for transmission of heat to said thermostatic element.

The upper arm 47 of the bell-crank lever extends close to a side wall of the casing, inside thereof, with the upper end spaced therefrom sufficiently to permit of to and fro movements, to the same relative extent as the vertical swinging movements of the lower arm. From the upper end of said upper arm extends an outwardly projecting finger 48 that projects into and through the hole 23 and the outer end of said finger is an indicator or semaphore 49 that normally rests in the recess 22.

Figure 2:
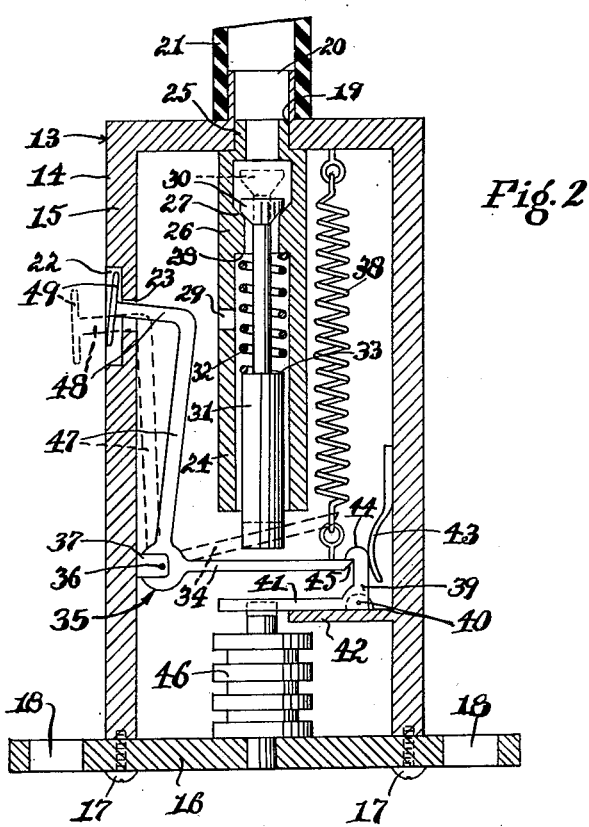
Fig. 2 is an enlarged vertical section of the control unit, some of the elements being shown in elevation.

In actual practice, when a journal box is moderately cool the parts will be positioned as illustrated in Fig. 2 and as the journal box warms up the thermostatic element will expand slightly but not effect the latch because it is spaced a sufficient distance from said thermostatic element to prevent operation thereof under ordinary conditions. Should the journal box become overheated so that the temperature becomes excessive, the thermostatic element will further expand until the upper free end engages the leg of the latch and finally tilts said leg until the latch proper is disengaged from the lower arm 34. Immediately, the spring 38 will actuate the bell-crank lever and cause the lower arm 34 to lift the lower end of the valve stem and unseat the valve. This will open an air passageway through the valve housing in communication with the signal air line so that, at least, the signal in the region of the operator's position will be sounded and will continue to function until the hot box condition is remedied.

When the bell-crank lever is operated, as above outlined, the upper arm 47 thereof will be moved outward towards the adjacent side wall of the casing thereby projecting the finger 48 from the outer end of the hole 23 and displacing the semaphore 49 from the recess 22 so that said semaphore will be readily visible to anyone walking beside the car. When the hot box is located whatever defect caused it may be corrected and as soon as the box has cooled the thermostatic element will contract and relieve the pressure on the leg of the latch. An attendant can now push the semaphore into its recess thereby actuating the bell-crank lever in the opposite direction to cause the lower arm 34 to ride over the head of the spring pressed latch and assume a position beneath the nose or beak thereof This resets the mechanism and the valve will close thus shutting off the flow of air and silencing the signal means.

Of course I do not wish to be limited to the exact details of construction herein shown and described as these may be varied within the scope of the appended claims without departing from the spirit of my invention.

Having described the invention what I claim as new and useful is:

1. The combination with a railway vehicle having a signal air line and journal boxes, of a control unit mounted on each journal box and including a casing providing a chamber having an air passageway forming a communication between said chamber and the exterior of the casing, a valve housing mounted within said casing and open at both ends with one end in communication with the air passageway and the opposite end spaced from the opposed wall which rests on a journal box, a valve seat in said housing, a valve plug coacting with said seat and having a valve stem protruding from said opposite end, means to urge the valve plug towards its seat, an expansible thermostatic element fixed to said opposed wall in endwise alignment with the valve housing and spaced from the latter, pivoted spring actuated means to contact the protruding end of the valve stem to unseat the valve plug, a spring pressed latch to normally hold said spring actuated means in a retracted position and having a leg in the path of travel of the movable portion of the thermostatic element for unlatching said latch, and means to provide a communication between the air passageway and the signal air line.

2. The structure according to claim 1 wherein the pivoted spring actuated means is an arm of a bell-crank lever which also includes a second arm having a finger projecting through a hole in the casing to the outside thereof for access to reset the pivoted spring actuated means.

3. The structure according to claim 2 wherein the casing has a recess in the outer surface thereof and in communication with the hole through which the finger projects, and a semaphore on the outer end of said finger and located in said recess when the elements of the mechanism are set for operation and the valve plug is seated.

4. In a device of the kind described, a control unit comprising a casing having an air passageway at the upper end for connection to a signal air line of a railway vehicle when the unit is fixedly mounted by its lower end on a journal box of said vehicle, an expansible thermostatic element within said casing and fixed to the lower end thereof leaving the upper end of said thermostatic element end free for movement, a valve housing within the casing in commuication with the air passageway and extending towards but spaced from the thermostatic element, a valve in said housing spring pressed towards the closed position and having a portion protruding from the housing, spring actuated means to contact the protruding portion of the valve to unseat the latter, and a latch resiliently urged towards its latching position and having a portion to be engaged by the thermostatic element when the latter expands a predetermined distance for unlatching said latch.

5. The structure according to claim 4, in combination with means to reset the spring actuated means, said resetting means having a part projectable through a wall of the casing for easy access and functioning as an indicator to show that the valve has been opened.

6. In a hot box indicator and signal for railway vehicles, a control unit to be mounted on an individual journal box and connected with a signal air line for causing the operation of a signal connected to said signal air line, comprising a casing providing a chamber and having an air passageway forming a communication between said chamber and the exterior of the casing, a spring actuated valve mechanism within the casing to control the flow of fluid through said passageway, a bell crank lever pivoted within the casing and having one leg positioned to engage a portion of the valve mechanism to open the latter and having a second leg extended along a wall of the casing, semaphore means on said second leg and normally within the outer surface of the casing, means to urge the first leg of the bell crank lever towards the valve mechanism and simultaneously project the semaphore means beyond the outer surface of said surface of said casing to visually indicate a particular hot box, a spring operated latch to hold the first mentioned bell crank leg out of engagement with the valve mechanism, and heat responsive means mounted on the casing within the same and effective to operate the latch to release the bell crank lever.

THEODORE MARKS, Jr.

REFERENCES CITED

The following references are of record in the file of this patent:

UNITED STATES PATENTS

| Number | Name | Date |
|---|---|---|
| 1,496,194 | Ziegler | June 3, 1924 |
| 2,400,399 | Down et al. | May 14, 1946 |
| 2,418,579 | Cranwell | Apr. 8, 1947 |